L. WOERNER.
PISTON ROD PACKING.
APPLICATION FILED JULY 11, 1914.

1,198,805.

Patented Sept. 19, 1916.

WITNESSES:
Chas. A. Becker
W. H. Alexander.

INVENTOR
Leo Woerner,
BY
E. E. Huffman
ATTORNEY.

UNITED STATES PATENT OFFICE.

LEO WOERNER, OF ST. LOUIS, MISSOURI.

PISTON-ROD PACKING.

1,198,805.  Specification of Letters Patent.  Patented Sept. 19, 1916.

Application filed July 11, 1914. Serial No. 850,338.

*To all whom it may concern:*

Be it known that I, LEO WOERNER, a citizen of the United States of America, residing at the city of St. Louis, State of Missouri, have invented a certain new and useful Piston-Rod Packing, of which the following is such a full, clear, and exact description, as will enable any one skilled in the art to which it appertains to make and use the same, reference being had to the accompanying drawings, forming part of this specification.

My invention relates to piston rod packing and is more particularly adapted for use in connection with an ammonia compressor or similar device requiring a very effective packing.

Figure 1:
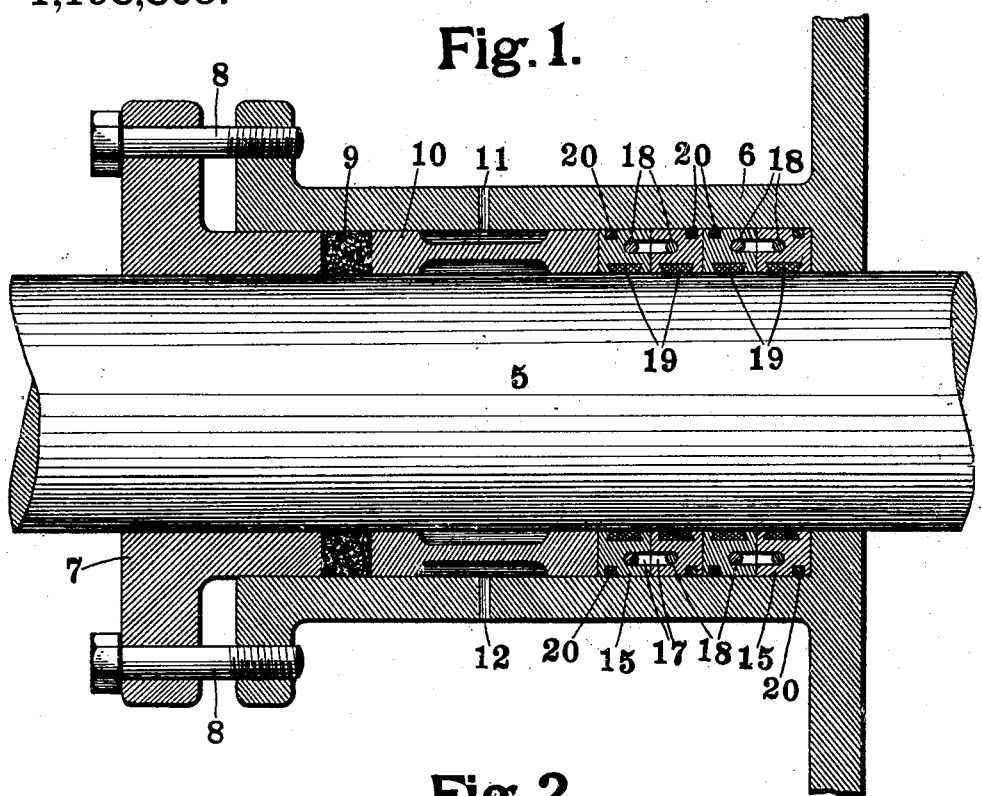
Figure 2:
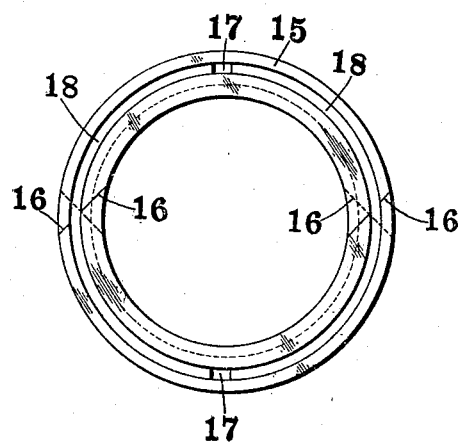

In the accompanying drawings, which illustrate one form of piston rod packing made in accordance with my invention, Figure 1 is a central section through a complete packing device, and Fig. 2 is one of the packing rings removed from the stuffing box.

Like marks of reference refer to similar parts in the several views of the drawings.

5 represents a piston rod. This rod 5 passes through a stuffing box 6. The end of the stuffing box 6 is closed by a gland 7 held in position by bolts 8. Surrounding the piston rod 5 adjacent to the gland 7 is a ring 9 of elastic or fibrous material, and adjacent to this ring 9 is an oil lantern 10 to allow the circulation of oil around the rod 5, the oil being allowed to enter through an opening 11 and discharged through an opening 12. All of the above parts are old and may be of any suitable form.

My invention resides in the particular form of packing rings which will now be described.

Each of the packing rings 15 is divided into two parts by inclined cuts 16 arranged on opposite sides of the rings, as best shown in Fig. 2. Formed in one lateral face of each of the rings 15 is a groove 17. This groove 17 contains the two part spring retaining ring 18. The parts of this retaining ring 18 are arranged, as shown in Fig. 2, so that the central part of each half of the ring will coincide with the cut portion 16 of the packing ring 15. The rings 15 are used in pairs and the pairs are placed with the grooves 17 facing each other, as shown in Fig. 1, so that the cuts 16 of one of the rings will be reversed and cannot be brought into registration with the cuts 16 of the corresponding ring, as is shown in dotted lines in Fig. 2. In the drawings, two pairs of rings are shown. The number of pairs, however, may be varied. Formed in the inner face of each of the rings 15 is an annular groove adapted to receive an insert 19 of Babbitt metal or other soft metal. The grooves containing this Babbitt metal 19 are somewhat dove-tailed in cross section, as shown in Fig. 1, so as to effectively retain the metal. The periphery of each of the rings 15 is also provided with a groove adapted to receive an insert 20 of rubber or other elastic material.

The operation of my packing will be evident. The retaining rings 18 being each made of two parts hold the packing rings 15 in position against a piston rod 5 much more effectively than can be done by a retaining ring formed in a single piece. The use of the inserts of soft metal in the interior of the rings and of elastic material in the periphery of the rings also greatly aids in securing a perfectly tight joint between the rod and the stuffing box.

Having fully described my invention, what I claim as new and desire to secure by Letters-Patent of the United States is:

1. A two-part packing ring having an annular groove in one of its lateral faces, and a two-part retaining ring in said groove, said ring being formed of spring rods.

2. A two part packing ring having an annular groove in one of its lateral faces and a two-part retaining ring in said groove, said ring being formed of spring rods, the outer wall of said groove being substantially parallel with the wearing face of the ring whereby a support is formed for the central portions of the two-part spring retaining ring.

3. A two-part packing ring having an annular groove in one of its lateral faces, a two part spring retaining ring in said groove, an annular insert of soft metal in the inner face of said packing ring, and an annular insert of elastic material in the periphery of said packing ring.

In testimony whereof, I have hereunto set my hand and affixed my seal.

LEO WOERNER. [L. S.]

Witnesses:
 W. A. ALEXANDER,
 G. M. SHORE.

Copies of this patent may be obtained for five cents each, by addressing the "Commissioner of Patents,
Washington, D. C."